US008849597B2

(12) United States Patent
Viassolo et al.

(10) Patent No.: US 8,849,597 B2
(45) Date of Patent: Sep. 30, 2014

(54) ESTIMATION OF REMAINING BATTERY LIFE IN A WIND ENERGY APPLICATION

(75) Inventors: Daniel Viassolo, Katy, TX (US); Jason Hoffman, Houston, TX (US); Jianhui Zhang, Houston, TX (US)

(73) Assignee: Vestas Wind Systems A/S, Aarhus N. (DK)

( * ) Notice: Subject to any disclaimer, the term of this patent is extended or adjusted under 35 U.S.C. 154(b) by 242 days.

(21) Appl. No.: 12/872,581

(22) Filed: Aug. 31, 2010

(65) Prior Publication Data

US 2012/0053837 A1    Mar. 1, 2012

(51) Int. Cl.
G01R 31/36 (2006.01)
H01M 10/46 (2006.01)
F03D 9/02 (2006.01)
H01M 10/48 (2006.01)

(52) U.S. Cl.
CPC ............... *F03D 9/021* (2013.01); *H01M 10/46* (2013.01); *Y02E 10/72* (2013.01); *F05B 2260/80* (2013.01); *Y02E 60/12* (2013.01); *H01M 10/482* (2013.01); *F05B 2270/404* (2013.01)
USPC .......................................................... 702/63

(58) Field of Classification Search
USPC ............. 702/1, 57, 63, 64; 340/628; 700/287, 700/297; 320/101; 290/44
See application file for complete search history.

(56) References Cited

U.S. PATENT DOCUMENTS

| 6,191,556 | B1 | 2/2001 | Galbraith et al. |
|---|---|---|---|
| 2003/0184307 | A1 | 10/2003 | Kozlowski et al. |
| 2003/0231006 | A1 | 12/2003 | Tojima |
| 2010/0013647 | A1* | 1/2010 | Morris et al. ................. 340/628 |
| 2010/0121587 | A1* | 5/2010 | Vian et al. ........................ 702/63 |
| 2010/0138178 | A1* | 6/2010 | Paryani et al. ................... 702/63 |
| 2010/0250162 | A1* | 9/2010 | White et al. ...................... 702/63 |
| 2011/0193518 | A1* | 8/2011 | Wright et al. ................. 320/101 |
| 2011/0196633 | A1* | 8/2011 | Abe et al. ......................... 702/63 |
| 2012/0004781 | A1* | 1/2012 | Santos et al. .................. 700/287 |
| 2012/0053750 | A1* | 3/2012 | Viassolo et al. .............. 700/297 |
| 2012/0053837 | A1* | 3/2012 | Viassolo et al. .................. 702/1 |

FOREIGN PATENT DOCUMENTS

| DE | 19540827 A1 | 5/1996 |
|---|---|---|
| EP | 1450173 A2 | 8/2004 |
| WO | 2008148148 A1 | 12/2008 |

OTHER PUBLICATIONS

European Patent Office, International Search Report and Written Opinion issued in related International application No. PCT/DK2011/050319 dated Dec. 20, 2011.

* cited by examiner

*Primary Examiner* — Tung S Lau
*Assistant Examiner* — Stephanie Chang
(74) *Attorney, Agent, or Firm* — Patterson & Sheridan, LLP

(57) ABSTRACT

Method, system, and computer program product for estimating a consumed battery life of a battery used in a wind energy application. An energy storage system for use with a wind farm includes a rechargeable battery configured to be selectively charged by wind turbines or the power grid and configured to be selectively discharged to a power grid. One or more remaining battery life algorithms are used to compute a consumed battery life for the battery. A battery life curve characteristic of the battery and a state of charge profile are used as inputs to each remaining battery life algorithm.

20 Claims, 8 Drawing Sheets

ESTIMATION OF REMAINING BATTERY LIFE IN A WIND ENERGY APPLICATION

BACKGROUND

This application relates generally to electrical power generation and, more specifically, to the estimation of the consumed battery life and/or remaining battery life of a battery used in a wind energy application.

A utility-scale wind energy system or wind farm includes a group of wind turbines that operate collectively as a power plant to produce electrical energy without the consumption of fossil fuels. The output of wind energy from a particular wind turbine or wind farm is less consistent than the energy output from fossil fuel-fired power plants. As a result, the power from wind turbines operating at nominal conditions in a wind farm may not meet output requirements for the power plant. For example, the power from a power plant may not track the power forecast due to forecast errors. As another example, the rate of power production for a power plant may be outside of a desired range because of wind gusts. A conventional approach for dealing with these and other similar situations is to use controls to manage the operation of the wind farm, such as utilizing pitch control of the rotor blades to increase or decrease the power produced by the individual wind turbines.

Traditional utility-scale wind energy systems are not dispatchable sources of electricity that can be cycled on or off at the request of power grid operators. For that reason, a wind farm may include an energy storage device, such as one or more rechargeable batteries, that is linked to the power grid and that may assist with meeting requirements on the power production by the power plant. When energy demand peaks, the wind turbines of the wind farm will sink energy directly into the grid. When energy demand is diminished, excess energy from the wind turbines may be stored in the energy storage device and later discharged upon demand to alleviate any deficits in output requirements for the power plant.

The pattern of charge and discharge cycles for intermittent generators, such as wind turbines, may be irregular. Nevertheless, a battery experiencing on average a single daily charge and discharge for twenty years in a wind farm accumulates roughly 7,300 cycles. As a result, candidate batteries used in wind farms must be characterized by long cycle lifetimes. Battery life is dependent on both the depth of discharge and the rate of discharge, as well as other factors such as temperature, charging strategy, etc.

Accurate estimation of remaining battery life (RBL) may be important for batteries used in energy storage applications for wind energy. For example, knowledge of the RBL may find use in making appropriate adjustments to control strategies for the battery such that battery life is greater than the lifetime of the wind farm. As another example, knowledge of the RBL may be useful is in the context of battery monitoring and prognostics for the purposes of scheduling battery maintenance or replacements.

The estimation of remaining battery life and optimally sizing batteries is a difficult proposition. To determine remaining battery life, a determination must first be made of the consumed battery life. Typically, manufacturers may supply battery life data that indicates the projected number of cycles to failure as a function of the depth of discharge. However, the direct use of manufacturer-supplied battery life data may lead to gross errors in battery lifetime estimation, when the battery is used in a wind farm, due to the highly irregular pattern of charging and discharging. These gross errors may result in either a higher system cost than necessary or the specification of an undersized battery prone to premature failure.

Improved techniques are needed for estimating the consumed battery life and, therefore, the remaining battery life of a battery used in a wind farm application.

BRIEF SUMMARY

In an embodiment of the invention, a power plant includes a wind farm with a plurality of wind turbines configured to generate power for a power grid, an energy storage system, and a controller coupled in communication with the energy storage system and in communication with the plurality of wind turbines at the wind farm. The energy storage system includes a rechargeable battery configured to be selectively charged by the wind turbines or the power grid and configured to be selectively discharged to the power grid. The controller is configured to implement a first algorithm to compute a first consumed battery life for the battery. The controller is configured to use a battery life curve characteristic of the battery as a first input to the first algorithm and a state of charge profile as a second input to the first algorithm.

In another embodiment of the invention, a computer-implemented method is provided for lifetime estimation of a battery deployed in a power plant including a wind farm. The method includes computing a first consumed battery life for the battery with a first algorithm, supplying a battery life curve for the battery as a first input to the first algorithm used in the computation of the first consumed battery life, and supplying a state of charge profile for the battery as a second input to the first algorithm used in the computation of the first consumed battery life.

The method may be implemented as a computer program product in which instructions for performing the method are stored on a computer readable storage medium.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
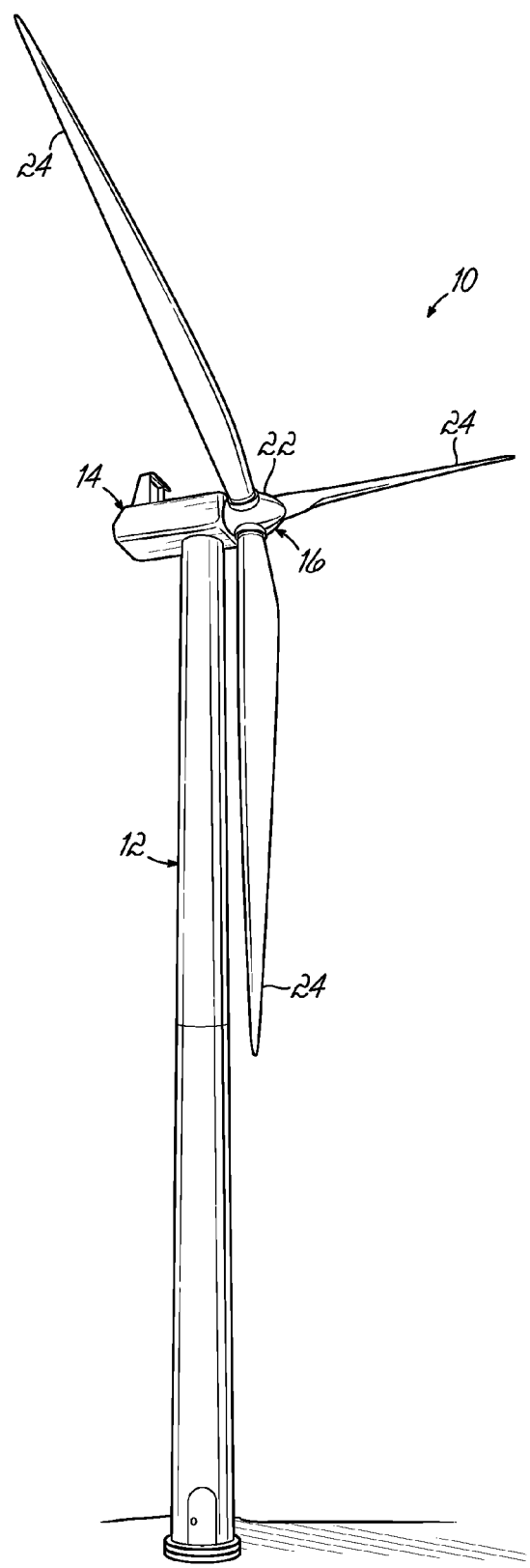
FIG. 1 is a perspective view of a wind turbine.
Figure 2:
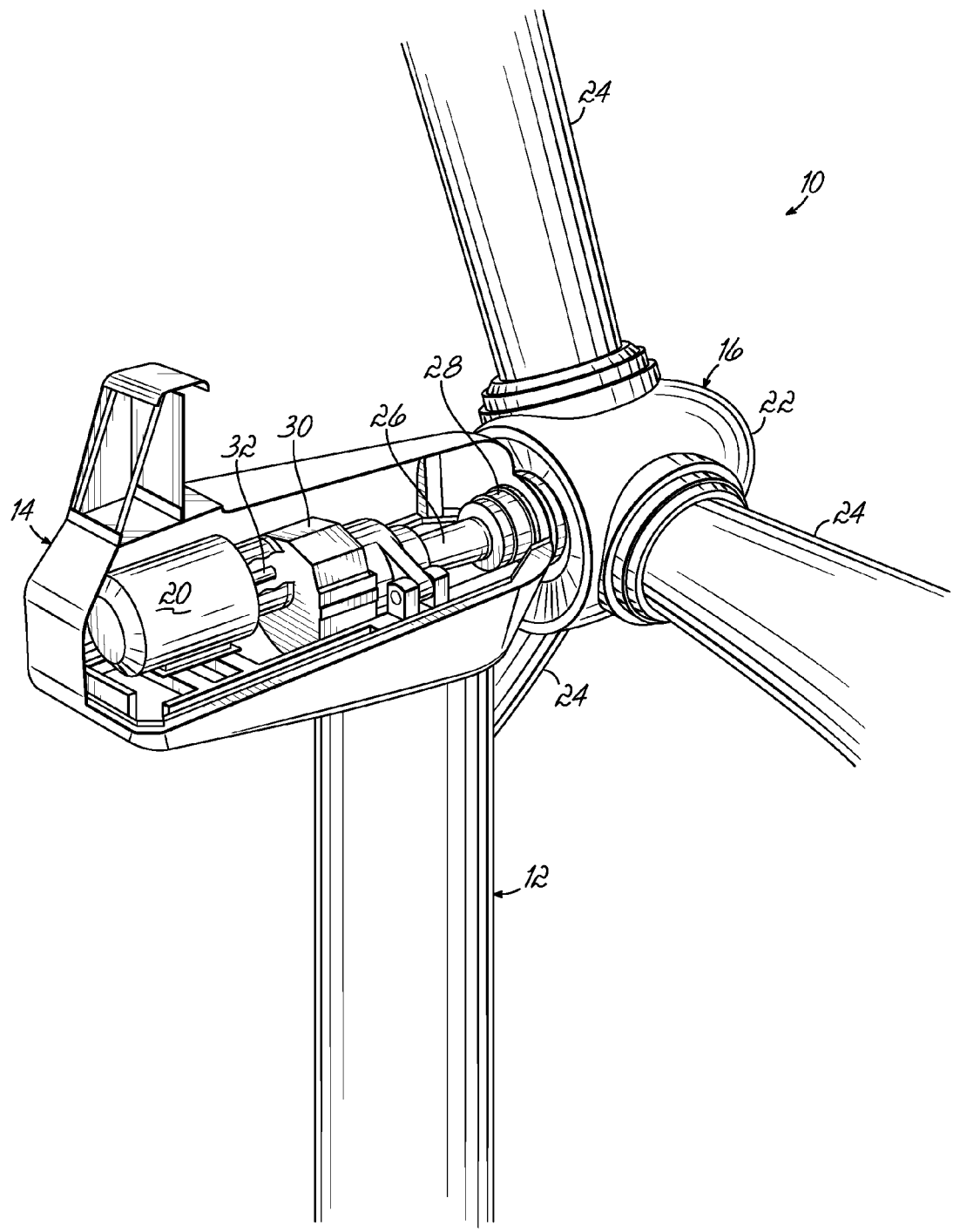
FIG. 2 is a perspective view of a portion of the wind turbine of FIG. 1 in which the nacelle is partially broken away to expose structures housed inside the nacelle.

With reference to FIGS. 1 and 2 and in accordance with an embodiment of the invention, a wind turbine 10, which is depicted as a horizontal-axis machine, includes a tower 12, a nacelle 14 disposed at the apex of the tower 12, and a rotor 16 operatively coupled to a generator 20 housed inside the nacelle 14. In addition to the generator 20, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 on an underlying foundation. The tower 12 of the wind turbine 10 also operates to elevate the nacelle 14 and rotor 16 to a height above ground level or sea level, as may be the case, at which faster moving air currents of lower turbulence are typically found.

The rotor 16 includes a central hub 22 and a plurality of blades 24 attached to the central hub 22 at locations circumferentially distributed about the central hub 22. In the representative embodiment, the rotor 16 includes a plurality of three blades 24 but the number may vary. The blades 24, which project radially outward from the central hub 22, are configured to interact with the passing air currents to produce aerodynamic lift that causes the central hub 22 to spin about its longitudinal axis. The design, construction, and operation of the blades 24 are familiar to a person having ordinary skill in the art. For example, each of the blades 24 is connected to the central hub 22 through a pitch mechanism that allows the blade to pitch under control of a pitch controller. The nacelle 14 and rotor 16 are coupled by a bearing with the tower 12 and a motorized yaw system (not shown) is used to maintain the rotor 16 aligned with the wind direction.

A low-speed drive shaft 26 is mechanically coupled at one end with the central hub 22 of the rotor 16 and extends into the nacelle 14. The low-speed drive shaft 26 is rotatably supported by a main bearing assembly 28 coupled to the framework of the nacelle 14. The low-speed drive shaft 26 is coupled to a gear box 30 having as an input the low-speed drive shaft 26, and having as an output a high-speed drive shaft 32 that is operatively coupled to the generator 20. The generator 20 may be any type of synchronous generator or asynchronous generator as recognized by a person having ordinary skill in the art and is generally understood to be a rotating electrical machine that converts mechanical energy into electrical energy by creating relative motion between a magnetic field and a conductor.

Wind exceeding a minimum level activates the rotor 16 and causes the blades 24 to rotate in a plane substantially perpendicular to the wind direction. The positive torque transferred from the rotor 16 to the generator 20 causes the generator 20 to convert the mechanical energy into AC electrical power so that the kinetic energy of the wind is harnessed for power generation by the wind turbine 10. The wind turbine 10 is characterized by a power curve describing the output power generated as a function of wind speed and the wind turbine 10 is operated with recognition of cut-in, rated, and cut-out wind speeds.

Figure 3:
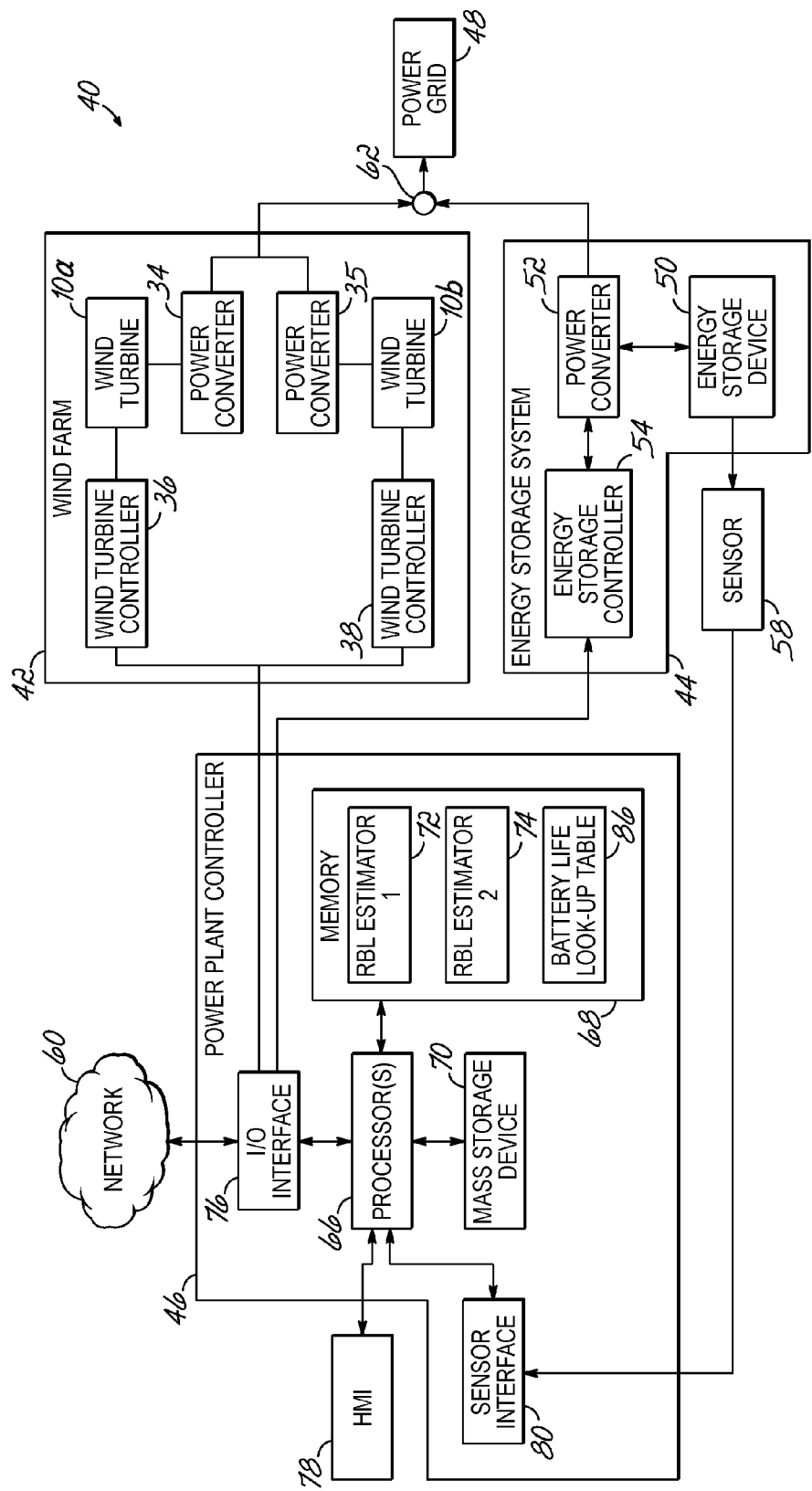
FIG. 3 is a diagrammatic view of a power plant that includes a wind farm, an energy storage device, and a power plant controller in accordance with an embodiment of the invention.
Figure 4:
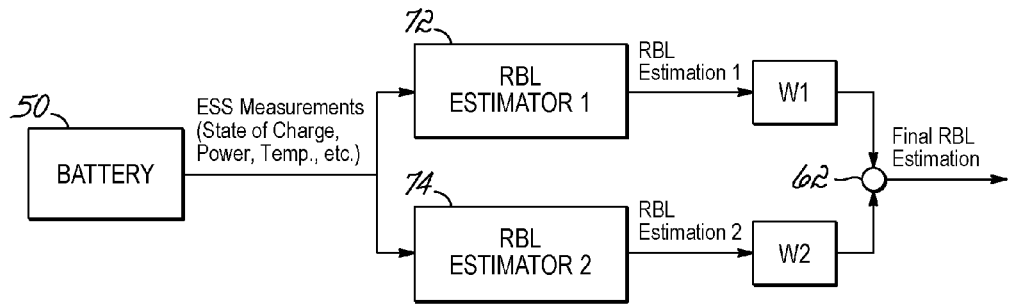
FIG. 4 is another diagrammatic view of a power plant of FIG. 3.

With reference to FIGS. 3 and 4, a power plant 40 includes a wind park or wind farm 42 containing a group of wind turbines 10a, 10b sited at a common physical location and an energy storage system 44, as well as a power plant controller 46 that provides supervisory control over the power plant 40. The power plant 40 is electrically coupled with a power grid 48, which may be a three-phase power grid. The wind turbines 10a, 10b each have a construction similar or identical to the construction of the representative wind turbine 10. The wind farm 42 may contain additional wind turbines (not shown) like the representative wind turbines 10a, 10b such that the total number of wind turbines in the wind farm 42 is arbitrary within reason. In various embodiments, the wind farm 42 may include from ten (10) to one hundred (100), or more, wind turbines distributed over tens of square kilometers of land area.

A power converter 34, 35 is configured to receive the AC voltage generated by the generator 20 of each of the wind turbines 10a, 10b and to supply an AC voltage to the power grid 48. Each of the wind turbines 10a, 10b includes wind turbine controller 36, 38 that manages the operation of the wind turbine components and subsystems. In one aspect of turbine management, each of the wind turbine controllers 36, 38 is coupled in communication with a respective one of the power converters 34, 35 and generates control signals for power output that are supplied to the power converter 34, 35. In response to the control signals, each power converter 34, 35 rectifies the AC voltage from the generator 20 of the wind turbine 10a, 10b to obtain a filtered DC voltage and then converts the DC voltage to an AC voltage at a desired constant frequency (e.g., 50 Hz or 60 Hz) that is output as three-phase alternating current (AC) to the power grid 48. The wind turbine controllers 36, 38 may control the functions of other sub-controllers that locally control parts of each wind turbine 10a, 10b, such as pitch control over the blades 24 of the rotor 16.

The energy storage system 44 includes a battery 50, a power converter 52, and an energy storage controller 54 that manages the operation of the power converter 52. The battery 50 is coupled with the power grid 48 and is in parallel arrangement with the generators 20 of the wind turbines 10a, 10b in wind farm 42. The energy storage controller 54 is coupled in communication with the power converter 52 and generates control signals that are supplied as commands to the power converter 52.

In a representative embodiment, the battery 50 may include one or more rechargeable electro-chemical storage batteries including, but not limited to, sodium sulfur batteries, lithium ion batteries, and vanadium redox batteries.

The energy storage controller 54, in conjunction with the wind turbine controllers 36, 38, controls the ability of the battery 50 to receive and store energy from the wind turbines 10a, 10b in wind farm 42. Excess energy produced by the wind turbines 10a, 10b may be stored in the battery 50. In response to control signals from the respective wind turbine controllers 36, 38, the power converters 34, 35, 52 are configured to direct power produced by the generators 20 of the wind turbines 10, 10b or from the power grid 48 to the battery 50.

At the direction of control signals received from the energy storage controller 54, the power converter 52 may be directed to discharge stored energy in a controlled manner as DC voltage from the battery 50 to the power converter 52. The power converter 52, which is similar to power converters 34, 35, is configured to receive the DC voltage output from the battery 50, filter the DC voltage, and then convert the filtered DC voltage to an AC voltage at the appropriate constant frequency. The AC voltage is then output from the energy storage system 44 as three-phase AC power to the power grid 48.

The power plant controller 46 is connected in communication with the wind turbine controllers 36, 38 in the wind farm 42. Wind interacts with the wind turbines 10a, 10b, as explained above, to generate electrical power from the torque supplied from the rotor 16 to the generator 20. Control signals from the power plant controller 46 are used by each of the wind turbine controllers 36, 38 to dynamically vary the output of the respective of the wind turbines 10a, 10b in wind farm 42 to meet certain output requirements on the generated electrical power. In response to a control signal received from the power plant controller 46, each of the wind turbine controllers 36, 38 can, for example, control the yaw of the nacelle 14 and rotor 16, and control the pitch of the blades 24 to limit the rotational speed of the respective wind turbine 10a, 10b.

The power plant controller 46 is connected in communication with the energy storage controller 54 serving the energy storage system 44. Control signals from the power plant controller 46 are used by the energy storage controller 54 to regulate the operation of the battery 50 and the power converter 52. In particular, the control signals from the power plant controller 46 are used to regulate the discharge of energy from the battery 50 of the energy storage system 44, as well as the charging of the battery 50 with energy transferred from the wind turbines 10a, 10b or from the power grid 48.

The power plant controller 46 is configured to control an amount of electrical power output from the power plant 40 to the power grid 48 at a point of common connection 62. The power output from the power plant 40 typically includes a contribution from each of the wind turbines 10 in the wind farm 42 and may include a contribution from the energy storage system 44. At a substation, a transformer increases the voltage of the electrical current arriving from the wind farm 42 for connection over the high-voltage transmission lines to the power grid 48.

At least one sensor 58 measures time-varying data from the energy storage system 44 to generate time-varying state information for variables relating to the operation of the battery 50. The at least one sensor 58 can monitor various parameters of the battery 50 and may include voltage sensors, current sensors, and/or any other sensor detecting data relevant for the functioning of the battery 50. The readings from the least one sensor 58 are communicated by a stream of signals to the power plant controller 46 and is correlated at the power plant controller 46 with the state of the energy storage system 44.

With continued reference to FIGS. 3 and 4, the power plant controller 46 is a supervisory control system that can be implemented using at least one processor 66 selected from microprocessors, micro-controllers, microcomputers, digital signal processors, central processing units, field programmable gate arrays, programmable logic devices, state machines, logic circuits, analog circuits, digital circuits, and/or any other devices that manipulate signals (analog and/or digital) based on operational instructions that are stored in a memory 68. The memory 68 may be a single memory device or a plurality of memory devices including but not limited to random access memory (RAM), volatile memory, non-volatile memory, static random access memory (SRAM), dynamic random access memory (DRAM), flash memory, cache memory, and/or any other device capable of storing digital information. The power plant controller 46 has a mass storage device 70 that may include one or more hard disk drives, floppy or other removable disk drives, direct access storage devices (DASD), optical drives (e.g., a CD drive, a DVD drive, etc.), and/or tape drives, among others.

The processor 66 of the power plant controller 46 operate under the control of an operating system, and executes or otherwise relies upon computer program code embodied in various computer software applications, components, programs, objects, modules, data structures, etc. The computer program code residing in memory 68 and stored in the mass storage device 70 also includes a first remaining battery life (RBL) estimator algorithm 72 and a second remaining battery life (RBL) estimator algorithm 74 that, when executing on the processor 66, provide a fast and preferably real-time estimation of the remaining battery life of the battery 50. The computer program code typically comprises one or more instructions that are resident at various times in memory 68, and that, when read and executed by the processor 66, causes the power plant controller 46 to perform the steps necessary to execute steps or elements embodying the various embodiments and aspects of the invention.

Various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

For purposes of energy management and regulatory controls, the power plant controller 46 can be configured with an input/output (I/O) interface 76 to receive various types of input data from sources external to the power plant 40 through an applicable network 60 such as, for example, a local area network (LAN), wide area network (WAN), Internet, a wireless network, etc. employing a suitable communication protocol. In particular, the power plant controller 46 may receive a global set point for power production from an external source, such as a SCADA, over the network 60 using an appropriate SCADA protocol.

The power plant controller 46 includes a human machine interface (HMI) 78 that is operatively connected to the processor 66 in a conventional manner. The HMI 78 may include output devices, such as alphanumeric displays, a touch screen, and other visual indicators, and input devices and controls, such as an alphanumeric keyboard, a pointing device, keypads, pushbuttons, control knobs, etc., capable of accepting commands or input from an operator and communicating the entered input to the processor 66, and of displaying information to the operator.

The power plant controller 46 includes a sensor interface 80 that allows the power plant controller 46 to communicate with the sensor 58. The sensor interface 80 may be or may comprise one or more analog-to-digital converters configured to convert analog signals from the sensor 58 into digital signals for use by the processor 66 of the power plant controller 46.

With continued reference to FIGS. 3 and 4, power plant controller 46 uses the RBL estimator algorithms 72, 74 to estimate the consumed battery life for the battery 50 and, from the consumed battery life, the RBL estimator algorithms 72, 74 may estimate the remaining battery life for the battery 50. The estimation of the consumed battery life for the battery 50 is based upon historical information or data for the battery 50 in which the historical information reflects a usage pattern of past charge and discharge cycles. The estimation of the consumed battery life determined by the RBL estimator algorithms 72, 74 may be converted into a remaining battery life is dependent upon the projected application for the battery 50. As appreciated by a person having ordinary skill in the art, an estimator is a measurable function of the data in the form of the charge/discharge cycles that is used to infer the value of an unknown parameter, in this instance the consumed battery life of battery 50, in a statistical model.

At any instant in time, the battery 50 is characterized by a state of charge (SOC) that reflects the charge level of the battery 50 or, in other words, the available charge capacity remaining in the battery 50 numerically expressed as a fraction of a rated charge capacity. An SOC of 1.0 indicates that the battery 50 is fully charged, an SOC of zero (0) indicates that the battery 50 is fully discharged, and an SOC (e.g., 0.35) between fully discharged and fully charged indicates that the battery 50 is only partially charged. The SOC for battery 50 can be determined by measuring battery voltage with the sensor 58 and converting the battery voltage by a calculation using a known discharge curve of voltage as a function of the SOC for the battery 50. The SOC may be compensated to correct for temperature and/or battery current. Alternatively, the SOC for battery 50 may be determined by measuring the battery current as a function of time and converting the battery current with a calculation that time integrates the battery current. The power plant controller 46 may be used to calculate the SOC of battery 50.

Depth of discharge (DOD) is an alternate quantity for use in characterizing the charge status of battery 50 and is determined from changes in the SOC of the battery 50. The DOD represents the amount of charge capacity removed from a charged battery 50 and the amount of charge capacity then restored to the charged battery 50 numerically expressed as a fraction of a rated charge capacity for the battery 50. A DOD of unity (1) indicates that the battery 50 is fully discharged and then fully charged, and a DOD between 0 and 1 indicates that the battery 50 is only partially charged and partially discharged.

Alternatively, the SOC and the DOD may be expressed in terms of ampere-hours instead of the fraction of rated capacity or as a percentage. For example, the removal of 250 ampere-hours from the battery 50 rated at 1000 ampere-hours and the subsequent addition of 250 ampere-hours to the battery 50 results in a DOD of 0.25 as expressed herein.

An SOC profile may be determined from readings of one or more parameters monitored by the at least one sensor 58. The SOC profile is a curve depicting the SOC as a function of time and represents historical data reflecting the usage pattern for the battery 50.

In one embodiment, a first estimation for the consumed and/or remaining battery life of battery 50 is computed by the processor 66 of power plant controller 46 using the RBL estimator algorithm 72 and a SOC profile for the battery 50, and a second estimation for the consumed and/or remaining battery life of battery 50 is computed by the processor 66 of power plant controller 46 using the RBL estimator algorithm 74 and a SOC profile for the battery 50. The computations may be executed in parallel and the power plant controller 46 may input a battery life curve characteristic of the battery 50 to both RBL estimator algorithms 72, 74 in addition to the state of charge profile. In one embodiment, the estimate for the remaining battery life of battery 50 is calculated as a weighted average of the consumed and/or remaining battery life estimated by RBL estimator algorithm 72 and the consumed and/or remaining battery life estimated by RBL estimator algorithm 74. Mathematically, for the representative embodiment of individual estimates determined by RBL estimator algorithms 72, 74, the final estimate for the remaining battery life for battery 50 is given by:

$$RBL = W1*RBL1 + W2*RBL2$$

wherein RBL is a data-fused estimate, RBL1 is a first estimation representing the consumed and/or remaining battery life computed using the RBL estimator algorithm 72, W1 is a corresponding coefficient or weight in the combination, RBL2 is the second estimation representing the consumed and/or remaining battery life computed using the RBL estimator algorithm 74, and W2 is a corresponding coefficient or weight in the combination. The mathematical expression used to compute the RBL of battery 50 is a convex combination, which is a linear combination of RBL1 and RBL2 determined by the RBL estimator algorithms 72, 74 and in which the coefficients W1, W2 are non-negative and sum to unity (1).

While the representative embodiment relies on two RBL estimator algorithms 72, 74, the embodiments of the invention are not so limited. In alternative embodiments, W2 may be set equal to zero (0) such that RBL is equal to RBL1 or W1 may be set equal to zero (0) such that RBL is respectively equal to RBL1 or RBL equal to RBL2. In this instance, a single estimator is used to determine the remaining battery life of battery 50. In yet other alternative embodiments, more than two RBL estimator algorithms 72, 74 may be used in the convex combination with a weight assigned to the individual estimate determined from each of the algorithms. In addition, the mathematical algorithm used to compute the RBL may differ from the equation for a convex combination.

The process of FIG. 4 is a data fusion method in which the data RBL1, RBL2 produced by the individual RBL estimator algorithms 72, 74 is combined in a way that gives a best estimation, RBL, of the consumed battery life. The consumed battery life may be represented as an effective number of cycles that differs from the historical number of cycles for charge and discharge and that is influenced by the depth of discharge for each individual cycle in the irregular pattern of charging and discharging for battery 50.

As mentioned above, the RBL estimator algorithms 72, 74 may also estimate the amount of remaining battery life from the estimation of consumed battery life. Estimations of remaining battery life in terms of a number of cycles or a time period are contingent upon forecasting the future applications and use of battery 50.

Figure 5:
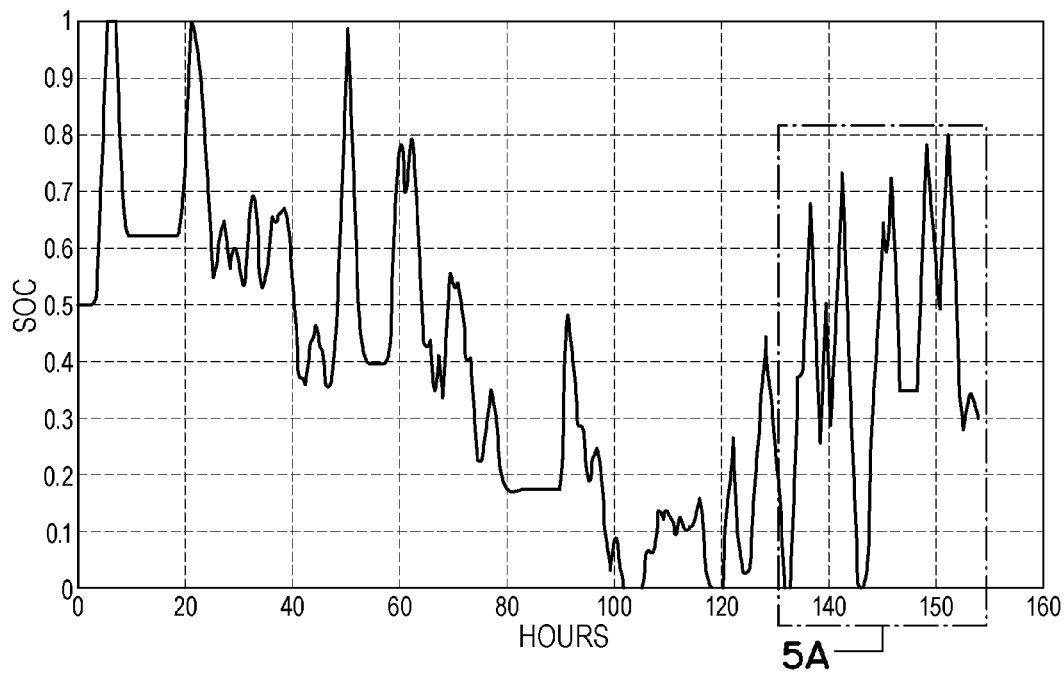
FIG. 5 is a graphical view of the state of charge as a function of time for a representative battery as the battery is charged and discharged during operation in a wind farm.
Figure 6:
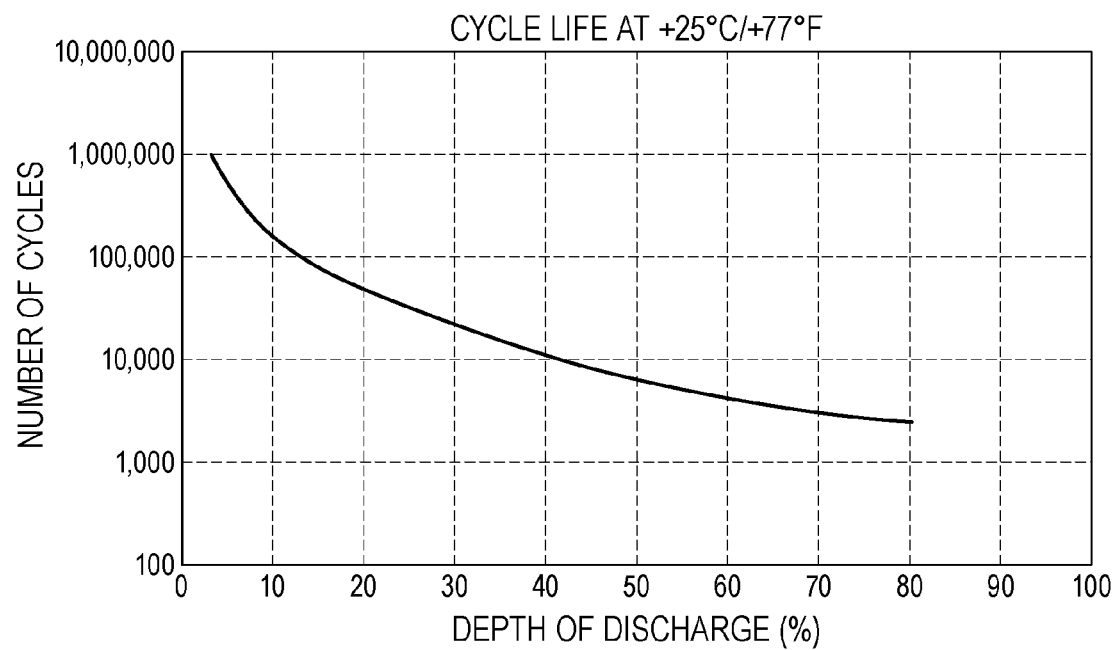
FIG. 6 is a graphical view of battery life data for the representative battery of FIG. 5.
Figure 7:
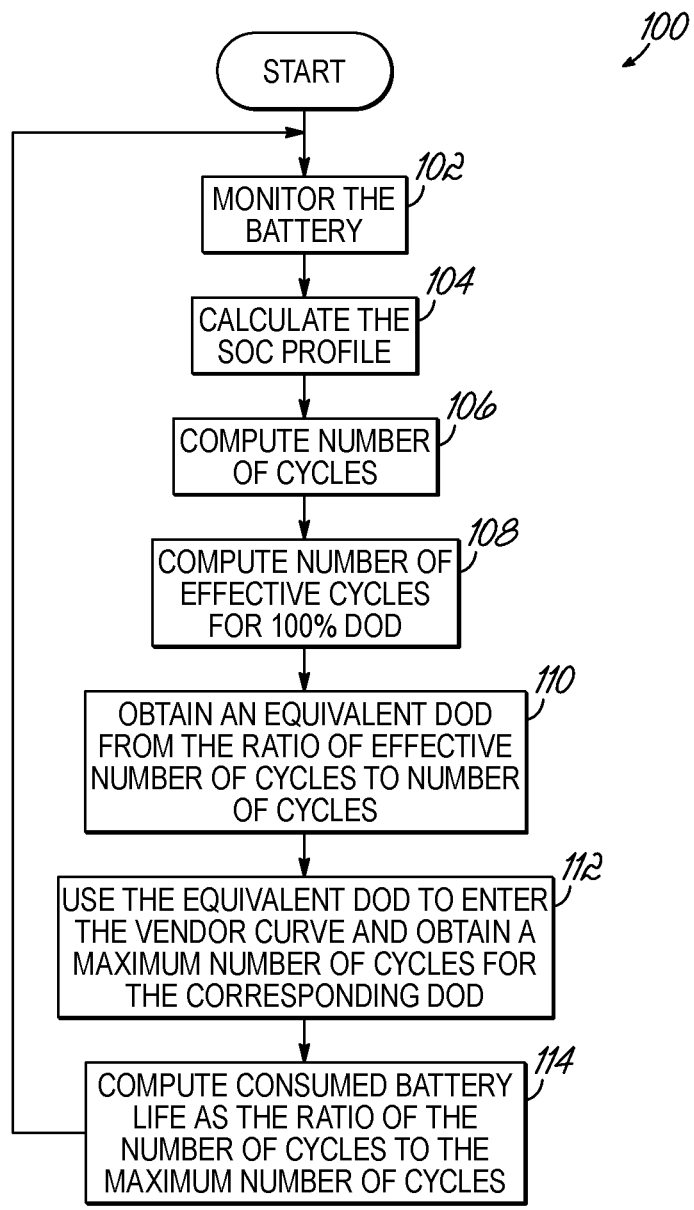
FIG. 7 is a flow chart for estimating consumed battery life in accordance with an embodiment of the invention.

With reference to FIGS. 5-7 and in accordance with a representative embodiment of the invention, the RBL estimator algorithm 72 may be premised on the concept of an equivalent DOD and the use of a battery life curve for the battery 50.

FIG. 7 shows a flowchart 100 illustrating a sequence of operations for the power plant controller 46 to estimate the consumed battery life from an SOC profile consistent with an embodiment of the invention. In block 102, the voltage and/or current output of the battery 50 is monitored by the sensor 58 on a given time scale for discrete readings. The power plant controller 46 receives the sensor readings via the sensor interface 80. In block 104, the processor 66 of the power plant controller 46 executes the RBL estimator algorithm 72 to calculate the SOC as a function to time based on the monitored parameters. The calculation of SOC is executed from the time that the battery 50 enters into service until the present time of evaluation.

The resulting SOC profile of battery 50 for a representative time period of its service life is shown in FIG. 5. The variations in the SOC over time reflect a typical pattern of charge and discharge cycles for battery 50 due to the intermittent and irregular power generation by the wind turbines 10a, 10b at the wind farm 42. The SOC profile in FIG. 5 may represent a portion of a SOC profile accumulated over the entire service life of the battery 50, which may be stored and maintained by the power plant controller 46. The RBL estimator algorithm 72 may be employed on an incremental basis, such as weekly, to compute incremental SOC profiles that are stored and maintained by the power plant controller 46 as an accumulated SOC profile.

Figure 5A:
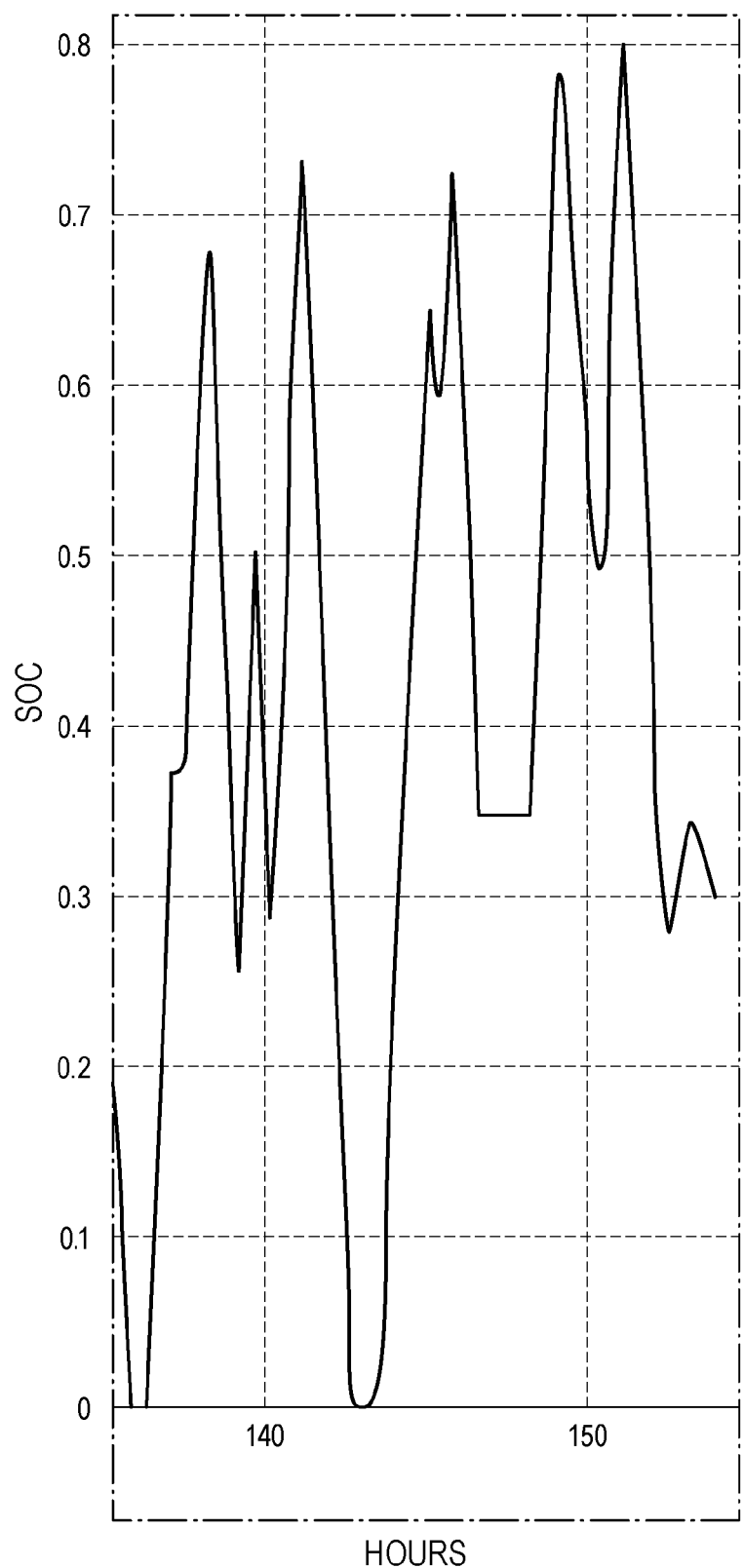
FIG. 5A is a detailed view of a portion of FIG. 5

In block 106, the RBL estimator algorithm 72 is used to compute a number of cycles from the accumulated SOC profile, including the portion shown in FIG. 5. The RBL estimator algorithm 72 may execute this task, for example, on a weekly basis and store the results in a database or other data storage structure in the mass storage device 70. Specifically, a number of cycles for charge and discharge is identified from the curve of the SOC profile for battery 50 (block 106). Each cycle is determined by the occurrence of a local maximum for the SOC in the curve. These maxima reflect inflection points in the curve where battery charging transitions to battery discharging. In FIG. 5A, eight (8) maxima are apparent in the curve over the interval from 135 hours to 155 hours. The number of cycles is determined by the total number of maxima in the curve. Alternatively, each cycle may be determined from the SOC profile in a different manner For example, each cycle is determined by the occurrence of a local minimum for the SOC in the curve. These minima reflect inflection points in the curve where battery discharging transitions to battery charging. Over the brief interval of FIG. 5A, eight (8) minima are apparent in the curve. The number of cycles is determined by the total number of minima in the curve over the interval from 135 hours to 155 hours.

In block 108, the RBL estimator algorithm 72 is used to compute a number of effective cycles from the data of the curve in the SOC profile. Each effective cycle is given by a line integral of the curve for each segment of the SOC profile that produces an effective cycle with 100% DOD. As a simple numerical example, five cycles in the curve with a 20% DOD would yield one effective cycle. Of course, the actual pattern of charge/discharge cycling in the SOC profile is more complex than this simple numerical example. For the brief interval in FIG. 5A, for example, the number of effective cycles is approximately equal to three (3).

In block 110, the RBL estimator algorithm 72 is used to compute an equivalent DOD from the number of effective cycles determined in block 108 and the number of cycles determined in block 106. In a representative embodiment, the equivalent DOD is defined by a simple ratio of the number of effective cycles to the number of cycles or, stated differently, the quotient determined from the number of effective cycles as the dividend and the number of cycles as the divisor. For the short interval of FIG. 5A, the equivalent DOD is equal to three (3) effective cycles divided by eight (8) cycles, or 0.375.

In block 112, the RBL estimator algorithm 72 enters a battery life curve (FIG. 6) for battery 50 at the equivalent DOD determined in block 110 to calculate the maximum number of cycles for the battery 50. The battery life curve is typically supplied or available from the vendor or manufacturer of the battery 50. The battery life curve is supplied to the RBL estimator algorithm 72 as, for example, a look-up table 86 maintained in the memory of the power plant controller 46. The lifecycle as a function of DOD for the battery 50, as shown in FIG. 6, indicates the number of cycles, to a specified depth of discharge, that battery 50 can undergo before failing to meet a specified capacity or an efficiency performance criteria. In particular, the battery life data contained in the curve reflects the projected number of cycles to failure as a function of the depth of discharge. The battery life data is presented with the assumption that all discharge cycles are under conditions of constant temperature, current, and depth of discharge.

For the interval of FIG. 5A, the RBL estimator algorithm 72 enters the battery life curve at an equivalent DOD of 0.375, which yields approximately 15,000 cycles of battery life as the maximum number of cycles.

In block 114, the RBL estimator algorithm 72 computes a consumed battery life given by the ratio of a cumulative number of cycles historically experienced by the battery 50 to the maximum number of cycles. The cumulative number of cycles represents the number of cycles experienced by the battery 50 (the sum of the incremental iterations of block 106) since the date that the battery 50 was put into service at the power plant 40. As mentioned above, the power plant controller 46 maintains and stores the accumulated SOC profile and/or a record of the total number of cycles experienced by the battery 50.

The remaining battery life represents the residual portion of the battery life for battery 50 that has not been consumed by battery degradation from past charge/discharge cycles. The conversion of the consumed battery life into a remaining battery life depends upon an application-specific forecast of the usage of battery 50. The remaining battery life determined by this exercise will represent an estimated period over which the battery 50 is projected to be capable of operating above a specified capacity or efficiency performance level.

With reference to FIGS. 5, 5A, 6, and 8 and in accordance with an alternative representative embodiment of the invention, the RBL estimator algorithm 74 may be premised on the concept of DOD decomposition and superposition in combination with the use of a standard curve of lifecycle as a function of DOD for the battery 50.

Figure 8:
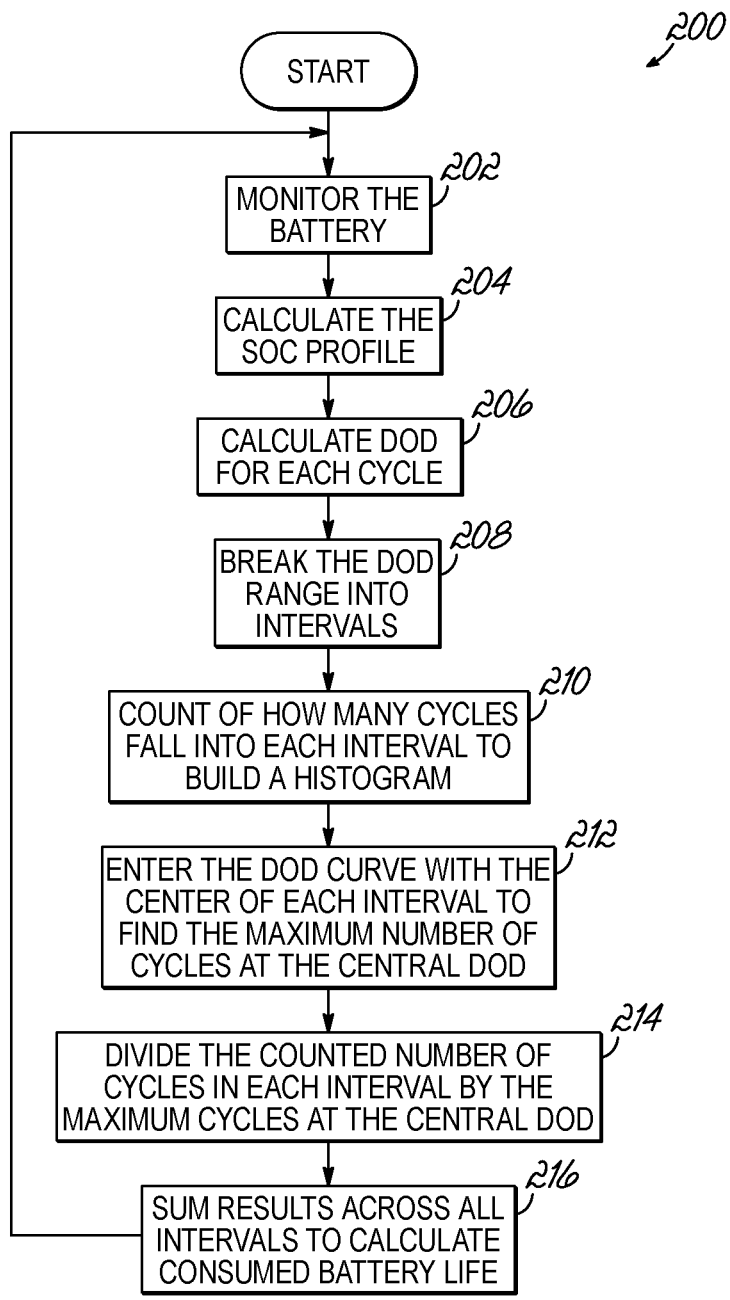
FIG. 8 is a flow chart for estimating consumed battery life in accordance with another embodiment of the invention.

FIG. 8 shows a flowchart 200 illustrating a sequence of operations for the power plant controller 46 to estimate remaining battery life from an SOC profile consistent with an embodiment of the invention. In block 202, the voltage and/or current output of the battery 50 is monitored by the sensor 58 on a given time scale for discrete readings. The power plant controller 46 receives the sensor readings via the sensor interface 80. In block 204, the processor 66 of the power plant controller 46 executes the RBL estimator algorithm 74 to calculate the SOC profile (FIG. 5) based on the monitored parameters. The SOC profile in FIG. 5 may represent a portion of a SOC profile accumulated over the entire service life of the battery 50, which may be stored and maintained by the power plant controller 46. The RBL estimator algorithm 72 may be employed on an incremental basis, such as weekly, to compute incremental SOC profiles that are stored and maintained by the power plant controller 46.

In block 206, the RBL estimator algorithm 74 calculates the DOD for each cycle in the SOC profile. In block 208, the range of DOD from a first numerical value (e.g., zero (0)) to a second numerical value (e.g., unity (1)) is partitioned into multiple bins or intervals. Preferably, the intervals are of equal width, the interval width is a given value, and the number of intervals is reasonably small. The number of intervals, interval width, and the range of DOD are inputs to the RBL estimator algorithm 74. In a representative embodiment, the number of intervals may be 10 over a DOD range of 0 to 1 so that the interval width is 0.1.

In block 210, the RBL estimator algorithm 74 is used to count how many cycles have a DOD that falls into each of the intervals. The RBL estimator algorithm 74 identifies each cycle in the SOC profile and, for each cycle, the RBL estimator algorithm 74 determines a DOD from the curve. The DOD is then classified by the RBL estimator algorithm 74 into one of the intervals assigned in block 206. In this manner, the RBL estimator algorithm 74 interval build a histogram with the determined number of cycles in each assigned interval. In the interval of FIG. 5A, every cycle has a DOD determined by each adjacent pair of maxima SOC's (or peaks) in the curve and each minimum SOC (or trough) between these maxima. For set of adjacent peaks (P1, P2) separated by an intervening trough (T), the DOD is given by the average of the SOC of one peak (P1) minus the SOC of the intervening trough (T) and the SOC of the next peak (P2) minus the SOC of the intervening trough (T). Expressed in the form of an equation, the DOD for a cycle is given by $((P1-T)+(P2-T))/2$.

In block 212, the RBL estimator algorithm 74 is used to enter battery life curve (FIG. 6) for battery 50 at a DOD representative of each interval to calculate the maximum number of cycles for the battery 50 at the representative DOD's for all of the intervals. In one embodiment, the representative DOD of each interval is the mid-point or center (i.e., average) of the corresponding interval range. For example, for ten intervals that cover a DOD range of 0 to 1, an interval that extend from a DOD of 0.4 to a DOD of 0.5 would have a representative DOD of 0.45 and the battery life curve would be entered for this particular interval as a DOD of 0.45.

In block 214, the counted number of cycles in each interval accumulated over the service life of the battery 50 is divided by the maximum number of cycles at the representative DOD of entry into the battery life curve corresponding to each particular interval.

In block 216, the RBL estimator algorithm 74 computes the consumed battery life by summing the results across all intervals to calculate the effective maximum number of cycles for all DOD's.

The remaining battery life represents the residual portion of the battery life for battery 50 that has not been consumed by battery degradation from past charge/discharge cycles. The conversion of the consumed battery life into a remaining battery life depends upon an application-specific forecast of the usage of battery 50. The remaining battery life determined by this exercise will represent an estimated period over which the battery 50 is projected to be capable of operating above a specified capacity or a specified efficiency performance level. The remaining battery life may be determined by projecting the consumption of battery life into the future based upon historical consumption.

As mentioned above, the specific embodiments of the RBL estimator algorithms 72, 74 described in connection with FIGS. 5-8 may be used in the data fusion computations of FIG. 4. Alternatively, the data fusion computations of FIG. 4 may use different types of RBL estimator algorithms 72, 74 than the representative embodiments described in connection with FIGS. 5-8.

The RBL estimator algorithms 72, 74 may permit the development of control strategies for the battery 50 that the power plant controller 46 can implement such that the battery life is not exhausted before the lifetime of the wind farm 42. In the context of battery monitoring and prognostics, the RBL estimator algorithms 72, 74 may be useful for the purposes of scheduling battery maintenance or replacements.

The RBL estimator algorithms 72, 74 do not rely either on a complex physical model, such as a Kalman Filter, or on a data-based model, such as a Neural Net. With regard to the latter, physics-based physical models are computationally heavy and need careful parameterization, even including lab experiments. With regard to the former, data-based models demand extensive training based on data from simulations or experiments. For these reasons, Estimators presented herein may have advantages over physical models and data-based models.

As will be appreciated by one skilled in the art, the embodiments of the invention may also be embodied in a computer program product embodied in at least one computer readable storage medium having non-transitory computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage medium include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code containing instructions for directing a processor to function in a particular manner to carry out operations for the embodiments of the present invention may be written in one or more object oriented and procedural programming languages. The computer program code may supplied from the computer readable storage medium to the processor of any type of computer, such as the processor 66 of the power plant controller 46, to produce a machine with a processor that executes the instructions to implement the functions/acts of a computer implemented process for sensor data collection specified herein.

The consumed battery and remaining battery life may be estimated by the RBL estimator algorithms 72, 74 in real time relative to the operation of the power plant 40. As used herein, real-time refers to determinations occurring at a substantially short period and without substantial intentional delay after the sampling of the SOC profile at each measurement interval.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of" or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, the computations by the RBL estimator algorithms 72, 74 may be executed on a different controller associated with the power plant 40 rather than specifically the power plant controller 46 or the computations may be performed by a remote or local computing device and supplied to the power plant controller 46. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A power plant coupled with a power grid, the power plant comprising:

a wind farm including a plurality of wind turbines configured to generate power for the power grid;

an energy storage system including a rechargeable battery configured to be selectively charged by the wind turbines or the power grid and configured to be selectively discharged to the power grid; and a controller coupled in communication with the energy storage system and in communication with the plurality of wind turbines at the wind farm, the controller configured to:

implement a first algorithm to dynamically compute a first consumed battery life for the battery, wherein the controller is configured to use a predetermined battery life curve of the battery as a first input to the first algorithm and a state of charge profile as a second input to the first algorithm, the state of charge profile comprises a plurality of individual state of charge measurements associated with the battery over a defined period of time reflecting the historical usage pattern of the battery, wherein the first algorithm is configured to identify one or more charging cycles from the state of charge profile and derive a depth of discharge value associated with the identified charging cycles, and implement a second algorithm different from the first algorithm to dynamically compute a second consumed battery life for the battery using as inputs the predetermined battery life curve and the state of charge profile.

2. The power plant of claim 1 wherein the controller is configured to computationally combine the first consumed battery life and the second consumed battery life to determine a data-fused consumed battery life.

3. The power plant of claim 2 wherein the controller computes the data-fused consumed battery life from a convex combination of the first consumed battery life and the second consumed battery life.

4. The power plant of claim 1 wherein the controller is a supervisory controller for the power plant.

5. The power plant of claim 1 further comprising:

a sensor coupled in communication with the controller, the sensor configured to monitor the voltage or current of the battery as the battery is selectively charged and discharged, and the sensor configured to communicate readings of the voltage or the current to the controller, wherein the controller is configured to calculate the state of charge profile from the readings received from the sensor as a function of time.

6. The power plant of claim 1 wherein the first algorithm is configured to:

identify a number of partial charging cycles from the state of charge profile, derive a number of complete charging cycles based on the identified number of partial charging cycles, determine a predicted maximum number of cycles for the battery using the battery life curve and a ratio of the number of partial charging cycles and the number of complete charging cycles, and determine the first consumed battery life based on the predicted maximum number of cycles and a cumulative number of cycles historically experienced by the battery.

7. The power plant of claim 6 wherein the second algorithm is configured to:

calculate a depth of discharge for each cycle in the state of charge profile, assign the depth of discharge for each cycle to one of a plurality of intervals partitioning a depth of discharge value range;

computing a number of cycles in each interval from the depth of discharge profile;

determining a maximum number of cycles from each interval from the battery life curve at a value for the depth of discharge inside each interval;

determine the second consumed battery life based on the maximum number of cycles from each interval.

8. A computer-implemented method for lifetime estimation of a battery deployed in a power plant including a wind farm, the method comprising:

computing, by operation of one or more computer processors, a first consumed battery life for the battery with a first algorithm;

supplying a predetermined battery life curve for the battery as a first input to the first algorithm used in the computation of the first consumed battery life;

supplying a state of charge profile for the battery as a second input to the first algorithm used in the computation of the first consumed battery life, the state of charge profile comprises a plurality of individual state of charge measurements associated with the battery over a defined period of time reflecting the historical usage pattern of the battery; and identifying, using the first algorithm, one or more charging cycles from the state of charge profile; and deriving, using the first algorithm, a depth of discharge value associated with the identified charging cycles computing, by operation of one or more computer processors, a second consumed battery life for the battery with a second algorithm, different from the first algorithm, using as inputs the predetermined battery life curve and the state of charge profile for the battery.

9. The computer-implemented method of claim 8 further comprising:

periodically charging the battery with energy from the wind farm or the power grid and discharging the battery to a power grid;

monitoring voltage or current of the battery as the battery is charged and discharged during operation at the power plant; and determining the state of charge profile from the monitored voltage or the monitored current as a function to time.

10. The computer-implemented method of claim 8 further comprising:

mathematically combining the first consumed battery life and the second consumed battery life to determine a data-fused consumed battery life.

11. The computer-implemented method of claim 10 further comprising:

forecasting a remaining battery life based upon the first consumed battery life and the second consumed battery life for the battery.

12. The computer-implemented method of claim 10 wherein the first consumed battery life for the battery is computed with the first algorithm in real time, and the second consumed battery life for the battery is computed with the second algorithm in real time.

13. The computer-implemented method of claim 8 further comprising:

combining the first consumed battery life and the second consumed battery life in a convex combination to determine a data-fused consumed battery life.

14. The computer-implemented method of claim 13 further comprising:

forecasting a remaining battery life based upon the first consumed battery life and the second consumed battery life for the battery.

15. The computer-implemented method of claim 13 wherein the first consumed battery life for the battery is computed with the first algorithm in real time, and the second consumed battery life for the battery is computed with the second algorithm in real time.

16. The computer-implemented method of claim 8 wherein computing the first consumed battery life for the battery with the first algorithm comprises:
    calculating a number of cycles from the state of charge profile;
    line integrating the state of charge profile to determine a number of effective cycles with a depth of discharge equal to unity;
    dividing the number of effective cycles by the number of cycles to obtain an equivalent depth of discharge; and
    determining a maximum number of cycles from the battery life curve at the equivalent depth of discharge to specify the first consumed battery life.

17. The computer-implemented method of claim 8 wherein computing the first consumed battery life for the battery with the first algorithm comprises:
    calculating a depth of discharge for each cycle in the state of charge profile;
    partitioning a range for the depth of discharge into a plurality of intervals;
    assigning the depth of discharge for each cycle to one of the intervals;
    computing a number of cycles in each interval from the depth of discharge profile;
    determining a maximum number of cycles from each interval from the battery life curve at a value for the depth of discharge inside each interval;
    dividing the number of cycles in each of the intervals by the maximum number of cycles for each respective interval to obtain a plurality of portions of the first battery life; and
    summing the portions to determine the second consumed battery life.

18. The computer-implemented method of claim 8 further comprising:
    forecasting a remaining battery life based upon the first consumed battery life for the battery.

19. The computer-implemented method of claim 8 wherein the first consumed battery life for the battery is computed with the first algorithm in real time.

20. A computer program product comprising:
    a non-transitory computer readable storage medium; and
    program instructions for performing the method of claim 8, wherein the program instructions are stored on the computer readable storage medium.

* * * * *